United States Patent [19]

Nishimura et al.

[11] Patent Number: 4,953,945
[45] Date of Patent: Sep. 4, 1990

[54] TRANSMISSION PROTECTIVE COATED OPTICAL FIBER TAPE

[75] Inventors: Akira Nishimura; Masaaki Nakasuji, both of Kanagawa, Japan

[73] Assignee: Sumitomo Electric Industries, Ltd., Osaka, Japan

[21] Appl. No.: 201,407

[22] Filed: Jun. 2, 1988

[30] Foreign Application Priority Data

Jun. 3, 1987 [JP] Japan .................. 62-86458[U]
Apr. 11, 1988 [JP] Japan .................. 63-48541[U]

[51] Int. Cl.$^5$ .................................................. G02B 6/44
[52] U.S. Cl. ................................................... 350/96.23
[58] Field of Search ............ 350/96.22, 96.23, 96.3, 350/96.34

[56] References Cited

U.S. PATENT DOCUMENTS 4,828,349 5/1989 Nakasuji .................. 350/96.33
4,900,126 2/1990 Jackson et al. ............. 350/96.23

FOREIGN PATENT DOCUMENTS 0293886 12/1988 European Pat. Off. ......... 350/96.23
60-170810 9/1985 Japan .......................... 350/96.23
61-13208 1/1986 Japan .......................... 350/96.23
61-47912 3/1986 Japan .......................... 350/96.23
1249008 11/1986 Japan .......................... 350/96.23
63-264713 11/1988 Japan .......................... 350/96.23
63-281109 11/1988 Japan .......................... 350/96.23
2096343 10/1982 United Kingdom ............. 350/96.23

Primary Examiner—John D. Lee
Assistant Examiner—John Ngo
Attorney, Agent, or Firm—Cushman, Darby & Cushman

[57] ABSTRACT

In a coated optical fiber tape comprises a plurality of optical fibers each having a coating and being aligned parallel in the same plane, a common coating layer covering the array of the optical fibers, and a peelable cured coating layer being provided between each of the coatings on the optical fibers and the common coating layer to prevent the latter from being bonded or urged to said coatings on the optical fibers, the improvement wherein the peelable cured coating layer has a compression modulus of elasticity of at least 5 kg/mm$^2$ but not exceeding 300 kg/mm$^2$.

1 Claim, 2 Drawing Sheets

TRANSMISSION PROTECTIVE COATED OPTICAL FIBER TAPE

BACKGROUND OF THE INVENTION

The present invention relates to a novel optical fiber tape that can be used advantageously in such applications as high density lightwave communications. More particularly, the present invention relates to a coated optical fiber tape furnished with a coating layer that allows easy handling in such operations as splicing and which exhibits superior resistance to lateral pressures.

With the recent advances in the technology of information communications, there has been a growing need for transmitting signals at a higher speed. One of the embodiments of such high-speed signal transmission technologies is the commercial application of lightwave communications. Besides being capable of realizing highspeed transmission by virtue of the nature of light itself, optical signal transmission not only exploits the light-weightness of optical fibers serving as lightguides but also offers distinct advantages in communications technol-ogy such as immunity to magnetic and electric fields. Notwithstanding these capabilities, conventional optical fibers as lightguides are yet to fully satisfy the requirement for transmitting a larger volume of signals and researchers are responding to this need by making various improvements of signal transmitting optical fibers.

Coated optical fiber tape is one of the applications of the techniques so far proposed under these circumstances. Coated optical fiber tape consists of an array of optical fibers serving as lightguides which are covered with a common coating layer to form a unitary assembly that has the potential to realize high-density signal transmission by simple handling.

FIG. 5 is a cross section showing the composition of a typical coated optical fiber tape. Light-transmitting optical fibers 1 individually furnished with a coating 2 are arranged side by side in tape form and provided with a common coating layer 4. In the prior art, the individual fiber coatings 2 and the common coating layer 4 are typically formed of an ultraviolet (uv) curable polyurethane acrylate resin.

In commercial operations, such coated optical fiber tape has to be spliced to other parts such as single coated optical fibers. In such instances, if the coated optical fibers to be spliced remain in tape form, problems will occur in terms of such aspects as handling and splicing loss. To solve these problems, the common coating layer 4 has to be stripped, followed by end preparation of individual fibers 1.

With a view to meeting this need, it has been proposed that a peelable cured coating layer be provided between the coatings 2 on the individual fibers 1 and the common coating layer 4 so as to prevent the common coating layer 4 from being bonded or urged to the fiber coatings 2. Coated optical fiber tapes having this construction are described in, for example, Japanese Utility Model Application No. 126584/1986.

One major problem with this type of coated optical fiber tapes is that the physical properties of the material of which the peelable cured coating layer is made have not been fully considered. As a consequence, installation of such a peelable cured coating layer often causes deterioration of the characteristics, in particular, lateral pressure resistance, of the coated optical fiber tape, and this leads to an undesired phenomenon such as increased transmission loss when a plurality of fiber tapes are assembled into a cable.

SUMMARY OF THE INVENTION

An object, therefore, of the present invention is to provide a coated optical fiber tape having improved lateral pressure resisting characteristics. This tape has been accomplished on the basis of both the theoretical and experimental reviews made by the present inventors in order to establish the fact that when the peelable cured coating layer was made of a material having compression moduli of elasticity within a certain range, the lateral pressure resisting characteristics of the fiber tape would deteriorate significantly.

In order to solve the aforementioned problem of the prior art on the basis of this finding, the present invention provides a coated optical fiber tape in which a peelable cured coating layer having a compression modulus of elasticity of at least 5 kg/mm$^2$ but not exceeding 300 kg/mm$^2$ is provided between the coatings on the individual fibers and the common coating layer surrounding the array of coated optical fibers.

DETAILED DESCRIPTION OF THE INVENTION

When lateral pressure is imposed on a coated optical fiber tape, the applied force is transmitted through the various coating layers to the optical glass fibers, thereby causing microbending which would increase the transmission loss occurring in the affected areas. Theoretically, the increase in transmission loss that occurs in the microbending portions of optical fibers under lateral pressure can be evaluated by determining the stresses that develop in the glass fibers when an external force is applied to the coated optical fiber tape (see, for example, Collected Papers for 1984 of the Light & Electric Wave Section, No. 2256, The Institute of Electronics and Communication Engineers of Japan).

Figure 2:
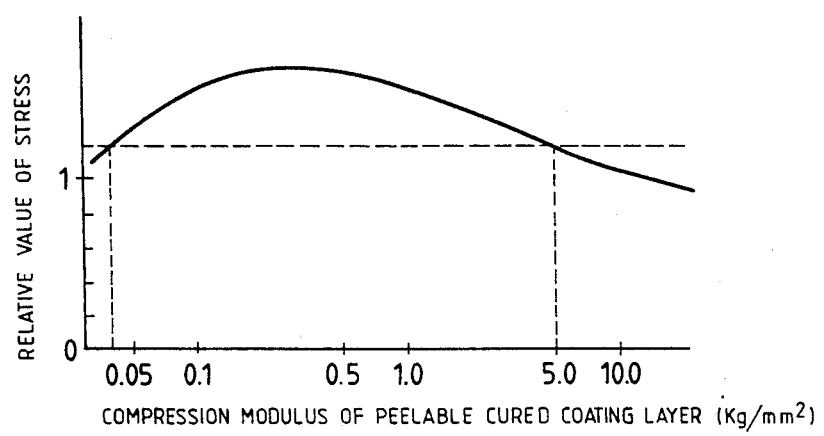
FIG. 2 is a graph showing the relationship between the compression modulus of a peelable cured coating layer and the relative value of stress developing in glass fibers.

The present inventors particularly noted the following two facts: first, no review has been made about the physical properties of a peelable cured coating layer incorporated in a coated optical fiber tape between the coatings on individual optical fibers and the common coating layer surrounding the array of such optical fibers; secondly, the compression modulus of elasticity of the peelable cured coating layer is closely related to the lateral pressure resisting properties of the fiber tape. On the basis of these findings, the present inventors investigated the relationship between the compression modulus of elasticity of the peelable cured coating layer in a coated optical fiber tape and the stresses developing in the glass fibers by the finite element method employing the stress analyzing program MSC/NASTRAN. The results of this analysis are shown in FIG. 2. The dimensions and physical properties of the individual components of the fiber under test that provided the basis for the calculations made to obtain the results shown in FIG. 2 were as follows:

| | |
|---|---|
| Diameter of glass fiber | 0.125 mm |
| Compression modulus of glass fiber | 7000 kg/mm$^2$ |
| Thickness of the first layer on glass fiber | 0.0375 mm |
| Compression modulus of the first layer on glass fiber | 0.15 kg/mm$^2$ |
| Thickness of the second layer on glass fiber | 0.02 mm |
| Compression modulus of the second layer on glass fiber | 70 kg/mm$^2$ |
| Minimum thickness of the common coating layer | 0.06 mm |
| Compression modulus of the common coating layer | 70 kg/mm$^2$ |

FIG. 2 shows that the stress developing in the glass fibers is largely dependent on the compression modulus of the peelable cured coating. At a compression modulus of 0.5 kg/mm$^2$, a maximum stress occurs in glass fibers, and at compression moduli either above or below 0.5 kg/mm$^2$, lower stresses will develop. Therefore, in order to ensure that the provision of a peelable cured coating layer will not cause more than 20% increase in the stress developing in glass fibers, one needs to employ a peelable cured coating layer having a compression modulus of elasticity of at least 5 kg/mm$^2$ or not exceeding 0.04 kg/mm$^2$. It should be noted here that results similar to those shown in FIG. 2 were obtained even when different values were selected for the dimensions and physical properties of the individual components of the coated optical fiber tape.

The peelable cured coating layer for use in the present invention may be formed of any resin that has photocuring (e.g., uv curable) or thermosetting properties to be readily moldable and which will not be urged or bonded to either the common coating layer or coatings on the individual optical fibers.

A typical example of such a resin that is suitable for use as the material of the peelable cured coating layer is a release agent that is chiefly made of a uv curable silicone or fluorine resin. The silicone or fluorine resin is an organic compound having silicon (Si) or fluorine (F) atoms in the molecule and which is curable by the action of heat or light to yield a cured product having good release properties.

The following examples are provided for the purpose of further illustrating the present invention but are in no way to be taken as limiting.

EXAMPLES 1-7

Figure 1:
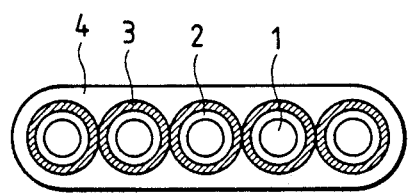
FIG. 1 is a cross-sectional view of a coated optical fiber tape according to an embodiment of thepresent invention.

FIG. 1 is a cross section showing the basic composition of the coated optical fiber tapes fabricated in Examples 1-7 in accordance with the present invention. As shown, each of the fiber tapes consists of optical fibers 1, a two-layered coating 2 on each fiber that is composed of the inner first layer and the outer second layer, a peelable cured coating layer 3 on each coated fiber, and a common coating layer 4.

In Examples 1-7, coated optical fiber tapes having the composition shown in FIG. 1 were fabricated, with their dimensions and physical properties being shown in the following table. The parameters listed in the table are: the outside diameter, core diameter, refractive index profile and differential refractive index of the glass fiber making each of the optical fibers 1; the thicknesses and compression moduli of elasticity of the first and second layers making up each of the fiber coatings 2; the thickness and compression modulus of elasticity of each peelable cured coating layer 3; the minimum thickness and compression modulus of elasticity of the common coating layer 4; and the cross-sectional dimensions of the coated optical fiber tape. A test was conducted to evaluate the lateral pressure characteristics of these seven fiber tapes.

The first and second layers of the fiber coatings 2 and the common coating layer 4 as well, were formed of a uv curable urethane acrylate resin, whereas the peelable cured coating layers were formed of a uv curable silicone acrylate resins.

TABLE

| Parameter | Example 1 | Example 2 | Example 3 | Example 4 | Example 5 | Example 6 | Example 7 |
|---|---|---|---|---|---|---|---|
| Glass Fiber: | | | | | | | |
| Fiber outer diameter | 125 μm | 125 μm | 126 μm | 125 μm | 125 μm | 125 μm | 125 μm |
| Core Dia. | 51 μm | 50 μm | 51 μm | 50 μm | 50 μm | 50 μm | 50 μm |
| Refractive index profile | graded index | graded index | graded index | graded index | graded index | graded index | graded index |
| Differential index | 1.0% | 1.0% | 1.0% | 1.0% | 1.0% | 1.0% | 1.0% |
| First Layer: | | | | | | | |
| Thickness | 38 μm | 38 μm | 38 μm | 38 μm | 38 μm | 38 μm | 38 μm |
| Compression modulus | 0.14 Kg/mm$^2$ | 0.14 Kg/mm$^2$ | 0.14 Kg/mm$^2$ | 0.14 Kg/mm$^2$ | 0.14 Kg/mm$^2$ | 0.14 Kg/mm$^2$ | 0.14 Kg/mm$^2$ |
| Second Layer: | | | | | | | |
| Thickness | 25 μm | 25 μm | 25 μm | 25 μm | 25 μm | 25 μm | 25 μm |
| Compression modulus | 55 Kg/mm$^2$ | 55 Kg/mm$^2$ | 55 Kg/mm$^2$ | 55 Kg/mm$^2$ | 55 Kg/mm$^2$ | 55 Kg/mm$^2$ | 55 Kg/mm$^2$ |
| Peelable Cured Coating Layer: | | | | | | | |
| Thickness | 5 μm | 5 μm | 5 μm | 5 μm | — | 5 μm | 5 μm |
| Compression modulus | 0.2 Kg/mm$^2$ | 0.74 Kg/mm$^2$ | 5.8 Kg/mm$^2$ | 10.3 Kg/mm$^2$ | — | 110 Kg/mm$^2$ | 203 Kg/mm$^2$ |
| Common Coating Layer: | | | | | | | |
| Minimum Thickness | 60 μm | 60 μm | 60 μm | 60 μm | 60 μm | 60 μm | 60 μm |
| Compression | 55 Kg/mm$^2$ | 55 Kg/mm$^2$ | 55 Kg/mm$^2$ | 55 Kg/mm$^2$ | 55 Kg/mm$^2$ | 55 Kg/mm$^2$ | 55 Kg/mm$^2$ |

TABLE-continued

| Parameter | Example 1 | Example 2 | Example 3 | Example 4 | Example 5 | Example 6 | Example 7 |
| --- | --- | --- | --- | --- | --- | --- | --- |
| modulus | | | | | | | |
| Cross-sectional Dimensions of Fiber Tape | $0.40 \times 1.43$ $mm^2$ | $0.40 \times 1.43$ $mm^2$ | $0.40 \times 1.43$ $mm^2$ | $0.40 \times 1.43$ $mm^2$ | $0.39 \times 1.38$ $mm^2$ | $0.40 \times 1.43$ $mm^2$ | $0.40 \times 1.43$ $mm^2$ |

Figure 3A:
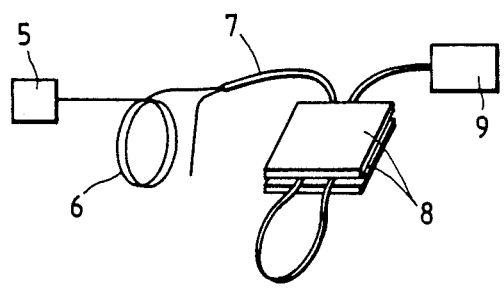
FIG. 3a and 3b illustrate a method for lateral pressure test to be conducted on a coated optical fiber tape.
Figure 3B:
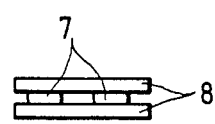

The lateral pressure characteristics of the fiber tapes fabricated in Examples 1–7 were evaluated by the test method illustrated in FIGS. 3a and 3b. As shown in FIG. 3a, the test apparatus was composed of a light source 5, an excitation dummy 6, a coated optical fiber tape 7, a pair of flat metal plates ($50 \times 50$ $mm^2$) 8 between which the fiber tape was to be held and given lateral pressure, and a power meter 9. FIG. 3b shows the essential part of a cross section of the metal plates 8 between which a fiber tape 7 is held and pressurized.

Figure 4:
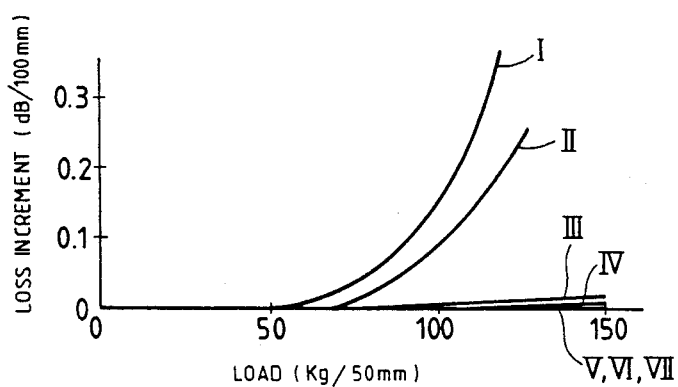
FIG. 4 is a graph showing the results of a lateral pressure test conducted on the coated optical fiber tapes fabricated in Examples 1-7 of the present invention.
Figure 5:
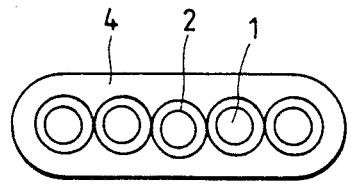
FIG. 5 is a cross-sectional view of a prior art coated optical fiber tape.

The results of the lateral pressure test conducted on the fiber tapes of Examples 1–7 are shown graphically in FIG. 4, in which curves I–VI show the data for the fiber tapes of Examples 1–7, respectively. The data shown in FIG. 4 were in agreement with the results of theoretical considerations.

As described on the foregoing pages, the coated optical fiber tape of the present invention has individual optical fibers coated with a peelable cured layer having a compression modulus of elasticity of at least 5 $kg/mm^2$ but not exceeding 300 $kg/mm^2$. This limitation on the compression modulus of the peelable cured coating layer is effective in improving the lateral pressure resisting properties of the fiber tape, thereby preventing the occurrence of increased transmission loss due to external force.

What is claimed is:

1. A coated optical fiber tape comprising:
   a plurality of optical fibers each having a coating and being aligned parallel in the same plane,
   a common coating layer covering the area of said optical fibers, and
   a peelable cured coating layer being provided between each of the coatings on the optical fibers and said common coating layer to prevent the latter from being bonded to said coatings on the optical fibers, said peelable cured coating layer comprising a material having a compression modulus of elasticity of at least 5 $kg/mm^2$ but not exceeding 300 $kg/mm^2$.

* * * * *